United States Patent
Stahl

(10) Patent No.: US 12,020,696 B2
(45) Date of Patent: Jun. 25, 2024

(54) AUTOMATIC SYNCHRONIZATION FOR AN OFFLINE VIRTUAL ASSISTANT

(71) Applicant: SoundHound, Inc., Santa Clara, CA (US)

(72) Inventor: Karl Stahl, Menlo Park, CA (US)

(73) Assignee: SoundHound AI IP, LLC, Santa Clara, CA (US)

(*) Notice: Subject to any disclaimer, the term of this patent is extended or adjusted under 35 U.S.C. 154(b) by 984 days.

(21) Appl. No.: 16/659,260

(22) Filed: Oct. 21, 2019

(65) Prior Publication Data

US 2021/0118435 A1    Apr. 22, 2021

(51) Int. Cl.
*G10L 15/00* (2013.01)
*G06F 16/242* (2019.01)
(Continued)

(52) U.S. Cl.
CPC ............ *G10L 15/19* (2013.01); *G06F 16/243* (2019.01); *G06F 40/253* (2020.01); *G10L 15/07* (2013.01);
(Continued)

(58) Field of Classification Search
CPC .... G06F 10/211; G06F 40/253; G06F 40/268; G06F 40/284; G06F 40/30; G06F 40/232; G06F 40/55; G06F 40/58; G06F 40/211; G10L 15/30; G10L 15/02; G10L 15/063; G10L 15/187; G10L 15/08; G10L 15/1822; G10L 15/183; G10L 15/19; G10L 15/193; G10L 15/07; G10L 15/20; G10L 15/22; G10L 15/26
See application file for complete search history.

(56) References Cited

U.S. PATENT DOCUMENTS 6,941,310 B2    9/2005  Ahad et al.
8,451,823 B2    5/2013  Ben-David et al.
(Continued)

FOREIGN PATENT DOCUMENTS

CN    103067793 A    4/2013
CN    108242235      7/2018
(Continued)

OTHER PUBLICATIONS

Tsurunaga, "Control of client-side caching", Web+DB Press vol. 80 dated Apr. 24, 2014.
(Continued)

*Primary Examiner* — Vu B Hang
(74) *Attorney, Agent, or Firm* — Vierra Magen Marcus LLP

(57) ABSTRACT

[Object] Technology is provided to enable a mobile terminal to function as a digital assistant even when the mobile terminal is in a state where it cannot communicate with a server apparatus.
[Solution] When a user terminal 200 receives a query A from a user, user terminal 200 sends query A to a server 100. Server 100 interprets the meaning of query A using a grammar A. Server 100 obtains a response to query A based on the meaning of query A and sends the response to user terminal 200. Server 100 further sends grammar A to user terminal 200. That is, server 100 sends to user terminal 200 a grammar used to interpret the query received from user terminal 200.

15 Claims, 18 Drawing Sheets

(51) Int. Cl.
*G06F 40/253* (2020.01)
*G10L 15/07* (2013.01)
*G10L 15/19* (2013.01)
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(56) References Cited

U.S. PATENT DOCUMENTS

| | | | |
|---|---|---|---|
| 9,305,554 B2* | 4/2016 | Jagatheesan | G10L 15/30 |
| 10,402,491 B2* | 9/2019 | Hosabettu | G06F 40/242 |
| 11,081,108 B2* | 8/2021 | Zhang | G06F 16/90332 |
| 11,170,762 B2* | 11/2021 | Aggarwal | G10L 15/07 |
| 11,217,241 B2* | 1/2022 | Kim | G06F 3/167 |
| 2007/0276651 A1 | 11/2007 | Bliss et al. | |
| 2015/0379568 A1 | 12/2015 | Balasubramanian et al. | |
| 2016/0065671 A1 | 3/2016 | Nallathambi et al. | |
| 2018/0025722 A1 | 1/2018 | Czahor | |
| 2018/0261216 A1 | 9/2018 | Leeb | |
| 2019/0206388 A1 | 7/2019 | Aggarwal et al. | |
| 2019/0222672 A1* | 7/2019 | Greenberg | G06N 3/08 |

FOREIGN PATENT DOCUMENTS

| | | |
|---|---|---|
| CN | 110277089 | 9/2019 |
| JP | 2002527919 | 8/2002 |
| JP | 2009193440 | 8/2009 |
| JP | 2011513795 | 4/2011 |
| JP | 2012094156 | 5/2012 |
| JP | 2019516150 | 6/2019 |
| KR | 19980038185 | 8/1998 |
| KR | 20160065671 | 6/2016 |
| WO | 2009111721 | 9/2009 |
| WO | 2019136285 | 7/2019 |

OTHER PUBLICATIONS

Hyun-Ki Kim et al., "Development status and advancement plan of Exobrain Korean language analysis and Q&A technology," Journal of Information Science 35.8 (2017): 51-56 (released on Aug. 2017).
English language Abstract for KR19980038185 published Aug. 5, 1998.
English language Abstract for KR20160065671 published Jun. 9, 2016.
Extended European Search Report dated Mar. 18, 2021 in European Patent Application No. 20203044.1.
English language Abstract for JP2019516150 published Jun. 13, 2019.
English language Abstract for JP2002527919 published Aug. 27, 2002.
English language Abstract for JP2009193440 published Aug. 27, 2009.
English language Abstract for CN110277089 published Sep. 24, 2019.
English language Abstract for JP2012094156 published May 17, 2012.
English language Abstract for JP2011513795 published Apr. 28, 2011.
English language Abstract for CN108242235 published Jul. 3, 2018.
Ian McGraw, et al., Personalized speech recognition on mobile devices. In 2016 IEEE International Conference on Acoustics, Speech and Signal Processing (ICASSP) Mar. 20, 2016 (pp. 5955-5959). IEEE.
Sri Garimella, et al., Robust i-vector based adaptation of DNN acoustic model for speech recognition. In Sixteenth Annual Conference of the International Speech Communication Association 2015.
English language Abstract for CN103067793 published Apr. 24, 2013.

* cited by examiner

FIG.11
GRAMMAR LIBRARY 16E

| DOMAIN | GRAMMAR | | OFFLINE SETTING | PREDICTED TYPE OF DATA | TIME-TO-LIVE | COUNT (1) | COUNT (2) |
|---|---|---|---|---|---|---|---|
| A | [A1] | "turn on the radio" | ON | — | — | 52 | 78 |
| | [A2] | "close the windows" | ON | — | — | 3 | |
| | [A3] | "open the windows" | ON | — | — | 4 | |
| | ... | | ... | ... | ... | ... | ... |
| B | [B1] | "show me medical record" | ON | — | — | 3 | 5 |
| | ... | | ... | ... | ... | ... | ... |
| C | [C1] | "check ⟨name of company⟩" | OFF | — | — | 15 | 45 |
| | ... | | ... | ... | ... | ... | ... |
| D | [D1] | "call ⟨name⟩" | ON | — | — | 20 | 40 |
| | [D2] | "play ⟨title⟩ by ⟨musician⟩" | ON | List of titles of songs by ⟨musician⟩ | — | 12 | |
| | ... | | ... | ... | ... | ... | ... |
| E | [E1] | "tell me recipe for ⟨dish⟩" | ON | recipes of dishes related to ⟨dish⟩ | — | 8 | 20 |
| | ... | | ... | ... | ... | ... | ... |
| F | [F1] | "what's on TV ⟨time⟩" | ON | TV program guide of the next day | one day | 10 | 95 |
| | ... | | ... | ... | ... | ... | ... |
| G | [G1] | "what's the weather today" | ON | weather forecast of the current place for seven days | seven days | 10 | 38 |
| | [G2] | "what's the weather in ⟨city⟩ today" | ON | weather forecast of ⟨city⟩ for seven days | seven days | 0 | |
| | ... | | ... | ... | ... | ... | ... |

FIG.12

USER INFORMATION 16F

| USER ID | TERMINAL ID | SENT GRAMMARS |
|---------|-------------|-------------------|
| 0001    | SP01        | DOMAIN A, DOMAIN C |
|         | SP11        | DOMAIN C          |
| 0002    | SP02        | DOMAIN B          |
| :       | :           | :                 |

FIG.14

LOCATION INFORMATION 2075

| LOCATION | GRAMMAR TO BE USED |
|---|---|
| HOME | DOMAINS D, E, F, G |
| OFFICE | DOMAIN C |
| : | : |

AUTOMATIC SYNCHRONIZATION FOR AN OFFLINE VIRTUAL ASSISTANT

FIELD OF THE INVENTION

The present disclosure relates to interpretation of natural languages, in particular, management of grammars for interpretation of natural languages.

BACKGROUND

Conventionally, a digital assistant which behaves in response to a query input by a user has been used. When a user uses a digital assistant, the user inputs a query to a client terminal such as a smart phone. When a user uses the digital assistant in a general manner, the client terminal sends a query to a server apparatus. The server apparatus performs speech recognition and natural language interpretation for the query to determine the meaning of the query. Then, the server apparatus searches a database corresponding to the determined meaning for a response to the query or generates the response, and/or obtains a response to the query by transmitting the query to an Application Programming Interface (API) corresponding to the determined meaning. The server apparatus sends the obtained response to the client terminal. The client terminal outputs the response. In other words, the client terminal behaves as part of the digital assistant by communicating with the server apparatus.

U.S. Patent Application Publication No. 2007/0276651 (Patent Literature 1), paragraph [0037] discloses a system in which a mobile terminal performs natural language interpretation. In this system, when the mobile terminal receives a speech from a user, the mobile terminal attempts natural language interpretation for that speech. If the mobile terminal fails natural language interpretation, the mobile terminal requests the server apparatus to perform natural language interpretation for the speech.

It may happen that the user desires to use the digital assistant at a location where the mobile terminal cannot communicate with the server apparatus (for example in a tunnel). There is a necessity to enable a mobile terminal to function as a digital assistant even when the mobile terminal is in a state where it cannot communicate with the server apparatus.

SUMMARY OF THE INVENTION

The present disclosure provides a technical solution to the above-described problems of conventional systems by enabling a mobile device to function as a digital assistant at times where a server apparatus is inaccessible. According to one aspect of the present disclosure, a computer-implemented method includes: receiving input of a query from a client terminal; performing natural language interpretation of the query using a grammar; outputting a response to the query after performing the natural language interpretation; and sending the grammar to the client terminal.

The method may further comprise determining, before sending a grammar to a client terminal, that a client does not store the grammar. Sending the grammar to the client terminal may be conditioned upon the client terminal not storing the grammar.

The method may further comprise determining, before sending a grammar to a client terminal, that the client terminal is configured to perform a function using the grammar in an offline state in which the client terminal is not connected to the computer. Sending the grammar to the client terminal is conditioned upon the client terminal being configured to perform the function using the grammar in the offline state.

In the method, sending a grammar to a client terminal may include sending other grammars belonging to a domain to which the grammar belongs.

The method may further comprise counting a number of times that a grammar is used in natural language interpretation of queries from a client terminal. Sending the grammar to the client terminal may be conditioned upon the counted number exceeding a threshold.

In the method, counting may include all times that grammars belonging to a domain to which the grammar belongs are used in natural language interpretation of the query.

The method may further comprise: predicting, based on the input query, a type of data needed to respond to a future query; and sending data of that type to the client terminal.

In the method, sending the data of that type may include sending a time-to-live of the data of that type.

In the method, a query input from a client terminal may include speech audio. The method may further comprise: training a speech recognition model personalized to a user of the client terminal by using utterances of the user; and sending the trained speech recognition model to the client terminal.

According to another aspect of the present disclosure, a server apparatus includes: one or more processors; and a storage device storing a program that, when executed by the one or more processors, causes the server apparatus to perform the method described above.

According to still another aspect of the present disclosure, an information system includes: a client terminal; and a server apparatus sending to the client terminal a response to a query input from the client terminal, wherein the server apparatus includes one or more processors to perform natural language interpretation of the input query using a grammar, and wherein the one or more processors send the grammar to the client terminal.

According to still another aspect of the present disclosure, a computer-implemented method includes: sending a first query to a server apparatus; receiving a grammar, from the server apparatus, used for natural language interpretation of the first query; storing the received grammar in a memory; receiving input of a second query; and performing, when the computer is not connected to the server apparatus, natural language interpretation of the second query using the grammar.

The method may further comprise: receiving input of a third query; performing, when a computer is not connected to a server apparatus, natural language interpretation of the third query; determining that natural language interpretation of the third query fails; storing the third query in the memory; and sending, in response to the failure, when the computer is connected to the server apparatus, the third query to the server apparatus.

The method may further comprise: receiving data related to a first query; storing data related to the first query in the memory; and acquiring a response to a second query using the data related to the first query.

In the method, wherein data related to the first query may include metadata indicating a time-to-live. The method may further comprise deleting the data related to a first query from a memory after time-to-live is expired.

The method may further comprise acquiring positional information of a computer. Performing natural language interpretation of a second query may include selecting a grammar to be used from one or more grammars in a memory based on the positional information.

The method may further comprise acquiring time information indicating a time when a second query is input. Performing natural language interpretation of the second query may include selecting a grammar from one or more grammars in a memory based on the time information.

In the method, receiving a second query may include receiving input of speech. The method may further comprise: receiving, from a server apparatus, a speech recognition model trained to be personalized to a user of a computer; and performing, when the computer is not connected to the server apparatus, speech recognition of the input speech using the speech recognition model.

According to still another aspect of the present disclosure, a computer-implemented method includes: receiving, when the computer is connected to a server apparatus, input of a first query; sending the first query to the server apparatus; receiving, from the server apparatus, a response to the first query; receiving, when the computer is not connected to the server apparatus, input of a second query; storing the second query in a memory together with time information indicating a time when the second query is input; sending, when the computer is connected to the server apparatus, the second query to the server apparatus together with the time information.

In the method, storing a second query in a memory may include storing the second query in a memory together with positional information of a computer at the time when the computer receives an input of the second query. Sending the second query to the server apparatus may include sending the second query to the server apparatus together with the positional information.

According to still another aspect of the present disclosure, a computer program, when executed by one or more processors of a client terminal, causes the client terminal to perform the method described above.

According to still another aspect of the present disclosure, a client terminal includes: one or more processors; and a memory storing a program that, when executed by the one or more processors, causes the client terminal to perform the method described above.

BRIEF DESCRIPTION OF THE DRAWINGS

FIG. 11 is a diagram representing a data configuration of a grammar library.

FIG. 12 is a diagram representing a data structure of user information.

FIG. 14 is a diagram representing an example of a data configuration of location information.

DETAILED DESCRIPTION

Hereafter, a reference will be made to the drawings to describe one embodiment of an information processing system. In the following description, identical parts and components are identically denoted. Their names and functions are also identical. Accordingly, they will not be described redundantly.

1. Outline of Query Processing System

Figure 1:
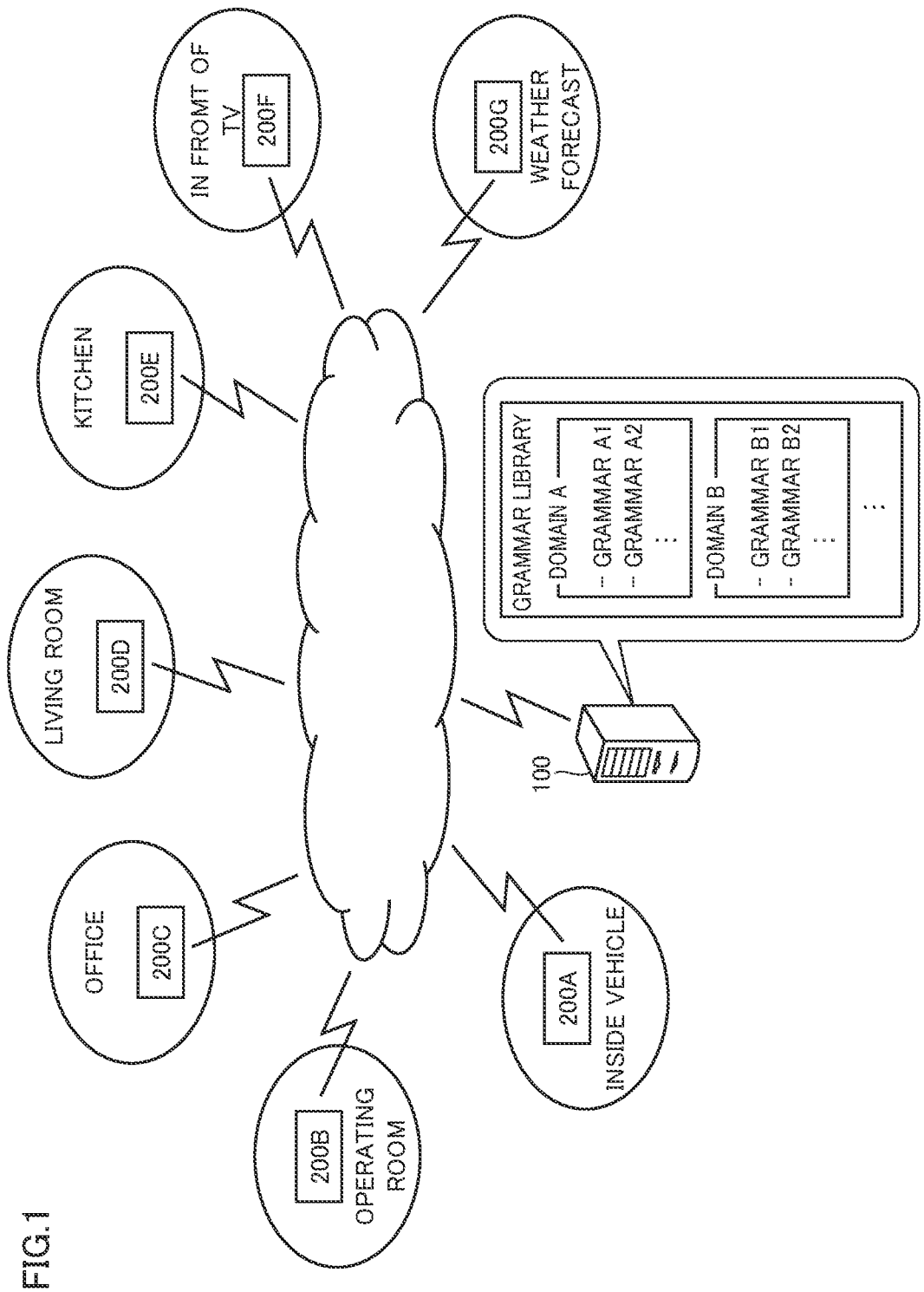
FIG. 1 is a diagram showing a schematic configuration of a query processing system.

FIG. 1 generally illustrates a configuration of a query processing system. The query processing system includes a server and a user terminal. In FIG. 1, the server is indicated as "server 100," and the user terminals is indicated as "user terminals 200A-200G" depending on the situation where the user terminal is used.

Figure 2:
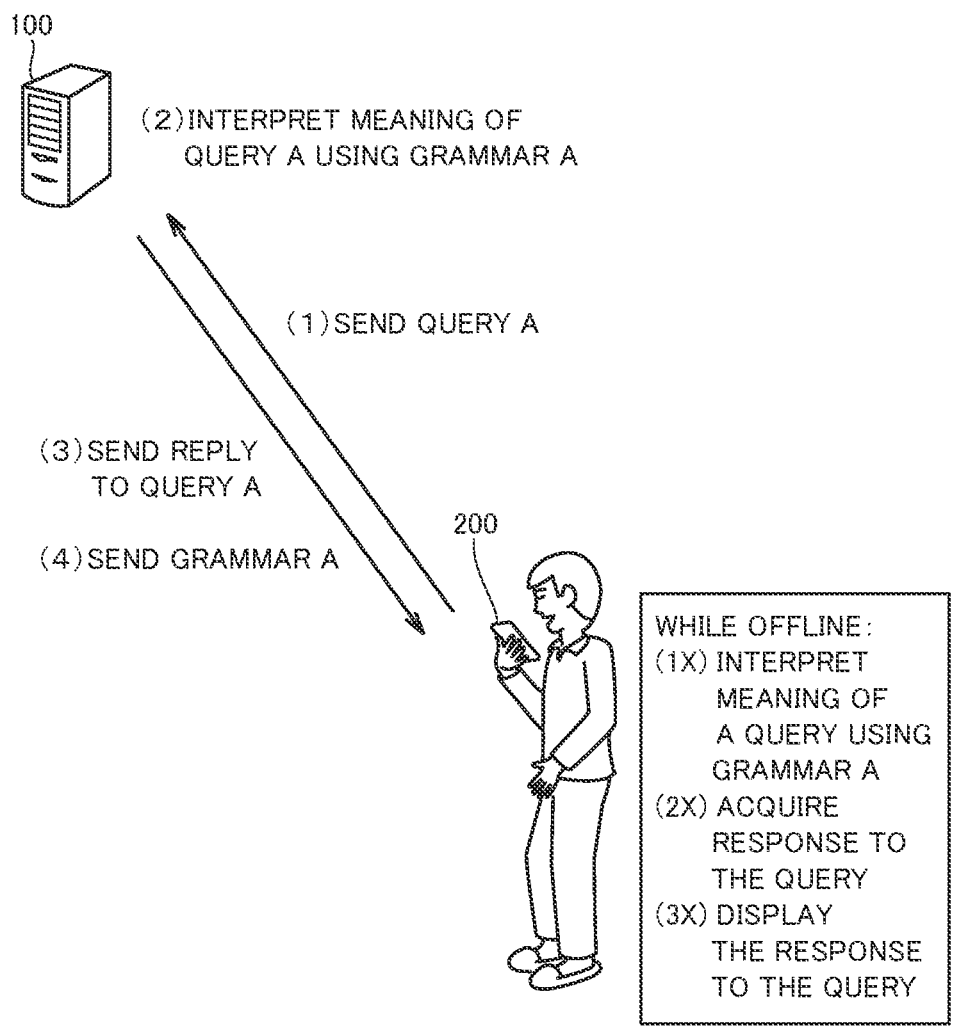
FIG. 2 is a diagram illustrating an implementation of processing a query in the query processing system.

FIG. 2 illustrates one implementation of processing of a query in the query processing system. In FIG. 2, a user terminal of any type is referred to as a "user terminal 200." The user terminal is an example of a client terminal.

As indicated as step (1), in response to input of query A, user terminal 200 sends query A to server 100. User terminal 200 may receive input of query A as voice through a microphone or as text data through a keyboard or a touch panel.

As indicated as step (2), server 100 interprets a meaning of query A using grammar A.

As indicated as step (3), server 100 formulates a response to query A based on the meaning of query A and sends the response to user terminal 200.

In the query processing system of FIG. 2, as indicated as step (4), server 100 further sends grammar A to user terminal 200. Namely, server 100 sends to user terminal 200 a grammar used in interpretation of a query that is received from user terminal 200.

User terminal 200 stores grammar A sent from server 100 in a memory of user terminal 200. While offline, in response to input of a query, user terminal 200 interprets the meaning of the query using grammar A (step (1X)), formulates a response to the query based on the meaning (step (2X)), and displays (and/or audibly outputs) the response (step (3X)).

2. Specific Example of Response To Query

FIGS. 3 to 9 each show a specific example of an aspect for processing a query by using user terminal 200.

2-1. FIG. 3

Figure 3:
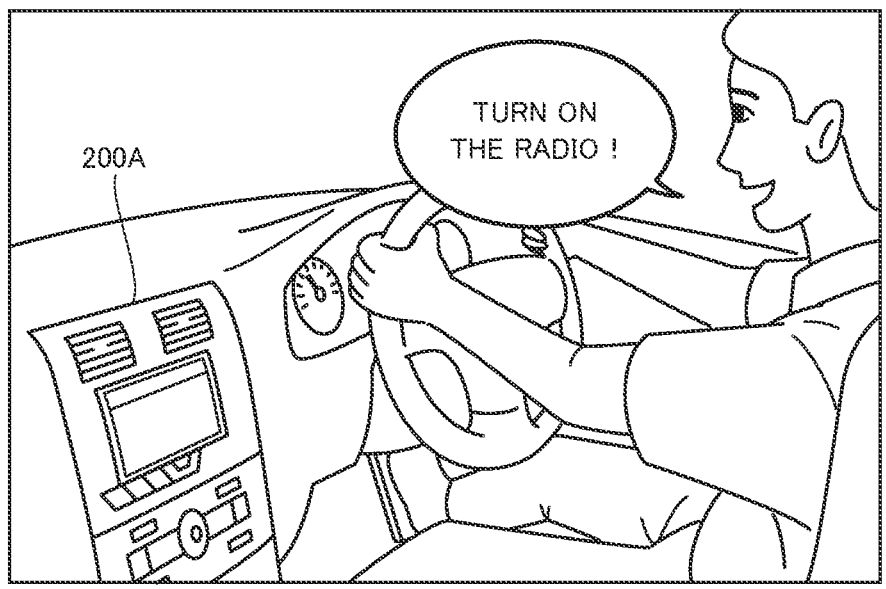
FIG. 3 is a diagram illustrating a specific example of an aspect for processing a query by using a user terminal.

In FIG. 3, as one example of user terminal 200, a user terminal 200A used in a vehicle is shown. User terminal 200A is an information processing terminal attached to a vehicle, for example.

A user utters "Turn on the radio!" to user terminal 200A as a query. User terminal 200A sends as a query, a signal corresponding to the utterance "Turn on the radio!" to server 100. In one implementation, the user may input the query after pushing a given button of user terminal 200A. User terminal 200A may receive the query as the button is operated, and user terminal 200A may send the received query to server 100.

Server 100 uses a grammar, which is for a function to operate an element of the vehicle, to interpret the meaning of the query received from user terminal 200A, and obtains a response to the query based on the meaning. As a response to the query received from user terminal 200A, server 100 sends a control signal for turning on the radio to user terminal 200A. In response, user terminal 200A turns on the radio of the vehicle that has user terminal 200A mounted therein.

Furthermore, as a response to the query received from user terminal 200A, server 100 may send an instruction to user terminal 200A to audibly output "The radio is turned on." User terminal 200A may audibly output "The radio is turned on." in response to the instruction being received.

2-2. FIG. 4

Figure 4:
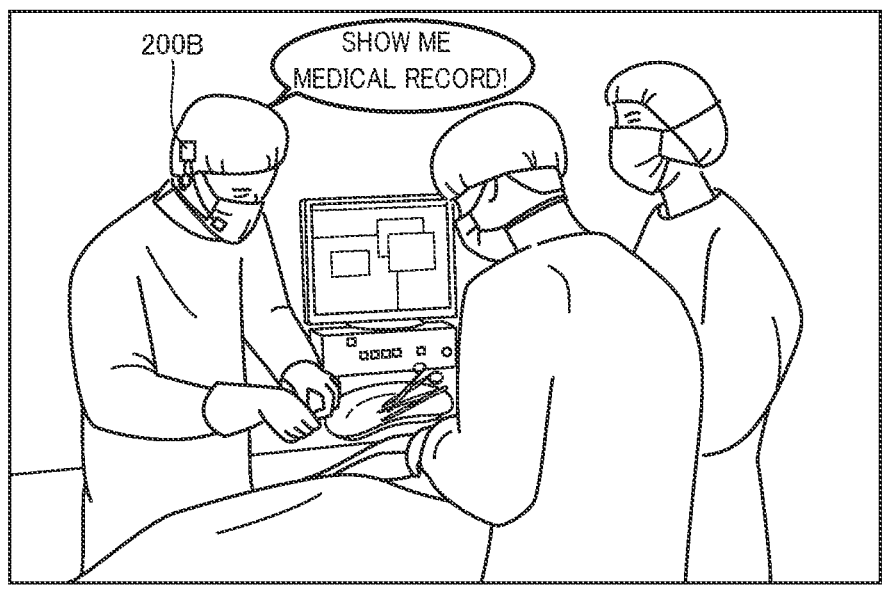
FIG. 4 is a diagram illustrating a specific example of an aspect for processing a query by using a user terminal.

In FIG. 4, as one example of user terminal 200, a user terminal 200B used in an operating room is shown. User terminal 200B is an information processing terminal attachable to the head of a doctor who is a user, for example.

The user utters "Show me the medical record!" as a query, to user terminal 200B. User terminal 200B sends as the query, a signal corresponding to the utterance "Show me the medical record!" to server 100. In one implementation, the user may input the query after saying a predetermined message (e.g., "OK!") for inputting the query. User terminal 200B may receive the query as the message is input, and user terminal 200B may send the received query to server 100.

Server 100 uses a grammar, which is for a function to provide information to the user in the operating room, to interpret the meaning of the query received from user terminal 200B, and forms a response to the query based on the meaning. The server 100 may form a response based solely on operations performed within server 100. Alternatively or additionally, the server 100 may form a response by acquiring data from a third party service provider or website. As a response to the query received from user terminal 200B, server 100 sends the medical record of the patient present in the operating room to user terminal 200B. In response, user terminal 200B displays the medical record on a display to which user terminal 200B is connected. Server 100 may send the medical record to a display (or a computer to which the display is connected) directly.

Furthermore, as a response to the query received from user terminal 200B, server 100 may send an instruction to user terminal 200B to audibly output "Here is the medical record of Mr. Yamada" (one example of a name of a patient). User terminal 200B may audibly output "Here is the medical record of Mr. Yamada" (one example of a name of a patient) in response to the instruction being received.

2-3. FIG. 5

Figure 5:
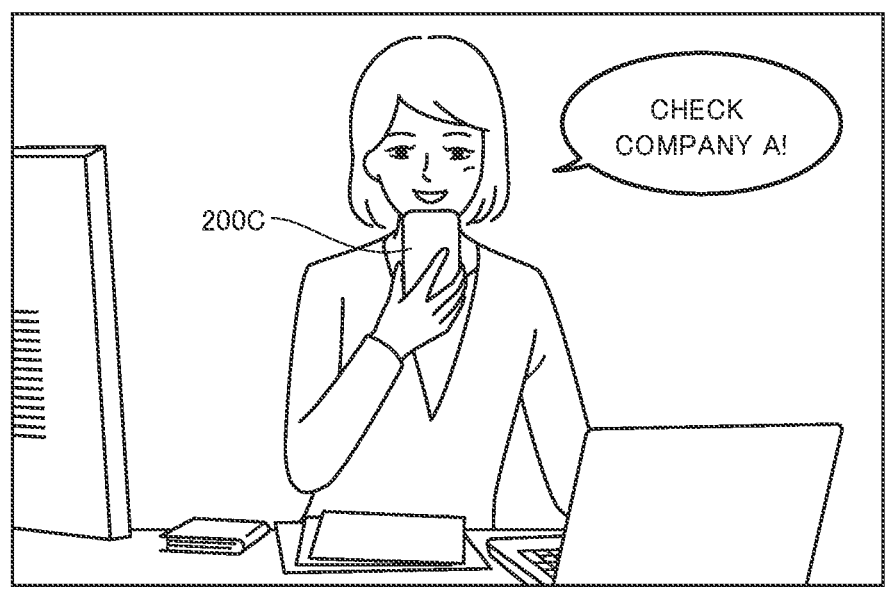
FIG. 5 is a diagram illustrating a specific example of an aspect for processing a query by using a user terminal.

In FIG. 5, as one example of user terminal 200, a user terminal 200C used in an office is shown. User terminal 200C is for example a smart phone.

The user utters "Check company A!" as a query to user terminal 200C. User terminal 200C sends a signal corresponding to the utterance "Check company A!" as the query to server 100.

Server 100 uses a grammar, which is for a function to provide information for stock prices, to interpret the meaning of the query received from user terminal 200C and forms a response to the query based on the meaning. As a response to the query received from user terminal 200C, server 100 sends company A's stock price to user terminal 200C. In response, user terminal 200C displays company A's stock price on the display of user terminal 200C, and/or audibly outputs company A's stock price through a speaker of user terminal 200C.

2-4. FIG. 6

Figure 6:
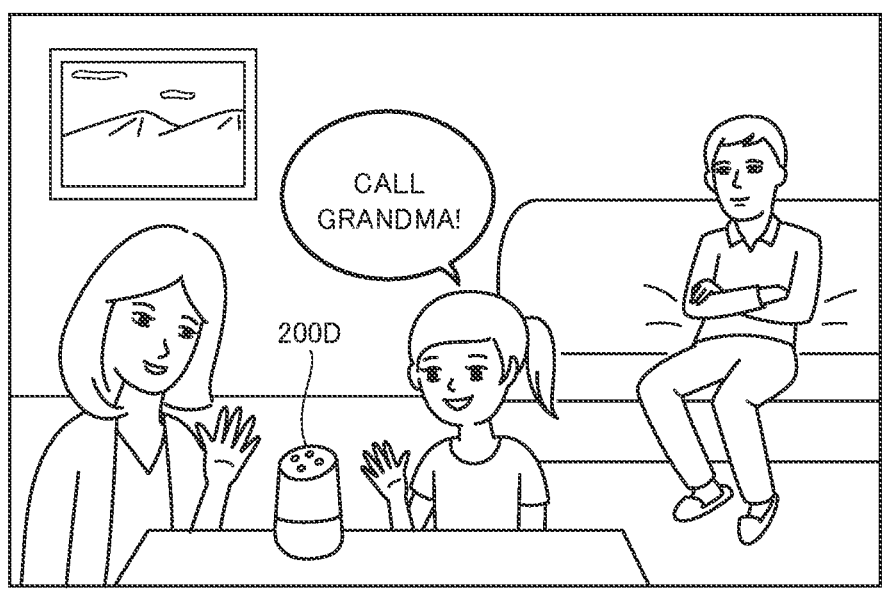
FIG. 6 is a diagram illustrating a specific example of an aspect for processing a query by using a user terminal.

In FIG. 6, as one example of user terminal 200, a user terminal 200D used in a house is shown. User terminal 200D is for example a smart speaker.

The user utters "Call Grandma!" to user terminal 200D as a query. User terminal 200D sends a signal corresponding to the utterance "Call Grandma!" to server 100 as the query.

Server 100 uses a grammar, which is for a call function, to interpret the meaning of the query received from user terminal 200D and forms a response to the query based on the meaning. As a response to the query received from user terminal 200D, server 100 sends an instruction to user terminal 200D to make a call to a telephone number stored in user terminal 200D as "Grandma." In response, user terminal 200D makes a call to the telephone number registered in user terminal 200D as "Grandma."

2-5. FIG. 7

Figure 7:
FIG. 7 is a diagram illustrating a specific example of an aspect for processing a query by using a user terminal.

In FIG. 7, as one example of user terminal 200, a user terminal 200E used in a kitchen is shown. User terminal 200E is for example a smart phone.

The user utters "Tell me a recipe for pot-au-feu!" as a query to user terminal 200E. User terminal 200E sends a signal corresponding to the utterance "Tell me a recipe for pot-au-feu!" to server 100 as the query.

Server 100 uses a grammar, which is for a function to provide information for cooking, to interpret the meaning of the query received from user terminal 200E and forms a response to the query based on the meaning. As a response to the query received from user terminal 200E, server 100 sends a recipe for pot-au-feu to user terminal 200E. In response, user terminal 200E displays the recipe for pot-au-feu on a display to which user terminal 200E is connected. Alternatively, as a response to the query, server 100 may send to user terminal 200E a list of links of websites which provide recipes of pot-au-feu. In that case, user terminal 200E displays the list. In response to the user selecting one link from the list, user terminal 200E connects to the selected link.

2-6. FIG. 8

Figure 8:
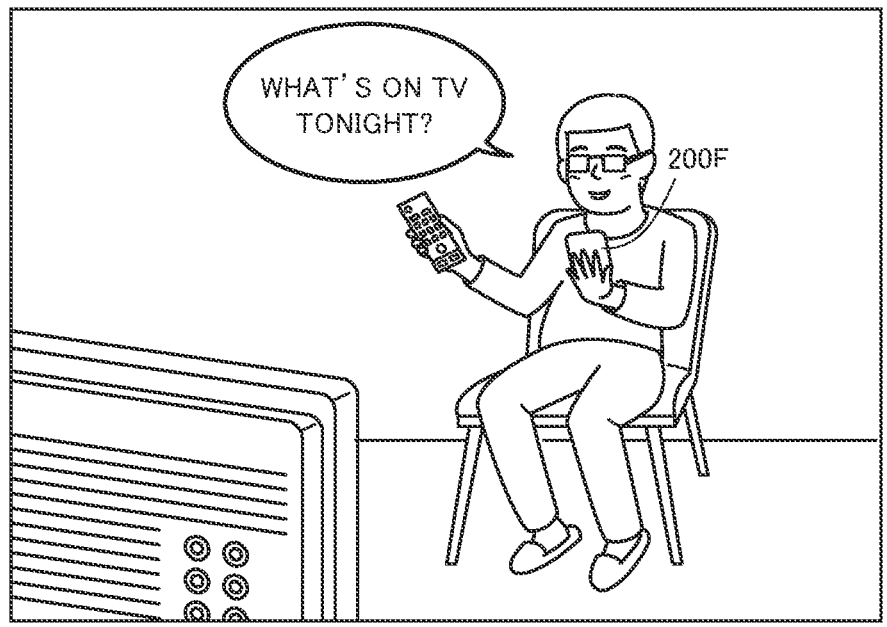
FIG. 8 is a diagram illustrating a specific example of an aspect for processing a query by using a user terminal.

In FIG. 8, as one example of user terminal 200, a user terminal 200F used by a user sitting in front of a TV set is shown. User terminal 200F is for example a smart phone.

The user utters "What's on TV tonight?" as a query to user terminal 200F. User terminal 200F sends a signal corresponding to the utterance "What's on TV tonight?" as the query to server 100.

Server 100 uses a grammar, which is for a function to provide information about TV programs, to interpret the meaning of the query received from user terminal 200F, and forms a response to the query based on the meaning. As a response to the query received from user terminal 200F, server 100 sends to user terminal 200F a TV program guide for the night of that day on which the query is input. In response, user terminal 200F displays the TV program guide received from server 100.

2-7. FIG. 9

Figure 9:
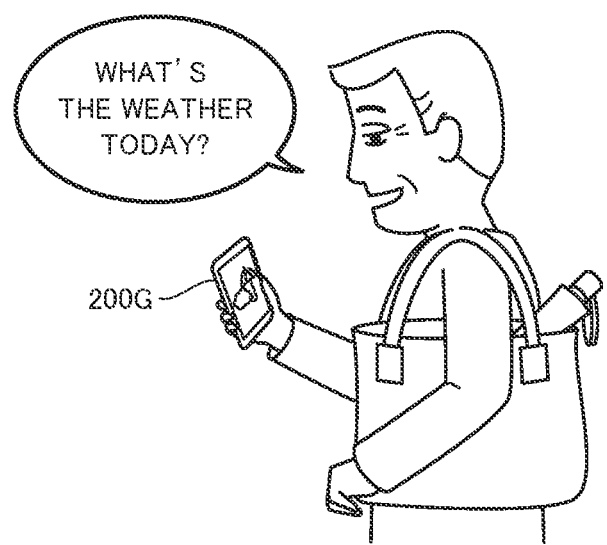
FIG. 9 is a diagram illustrating a specific example of an aspect for processing a query by using a user terminal.

In FIG. 9, as one example of user terminal 200, a user terminal 200G is shown. User terminal 200G is for example a smart phone.

The user utters "What's the weather today?" as a query to user terminal 200G. User terminal 200G sends a signal corresponding to the utterance "What's the weather today?" and an indication of the geolocation of the smart phone (user terminal 200G) to server 100 as the query.

Server 100 uses a grammar, which is for a function to provide information about weather, to interpret the meaning of the query received from user terminal 200G and forms a response to the query based on the meaning. As a response to the query received from user terminal 200G, server 100 sends to user terminal 200G a weather forecast for the location and day at and on, respectively, which the query is input to user terminal 200G. In response, user terminal 200G displays and/or audibly outputs the weather forecast received from server 100.

3. Hardware Configuration (Server 100)

Figure 10:
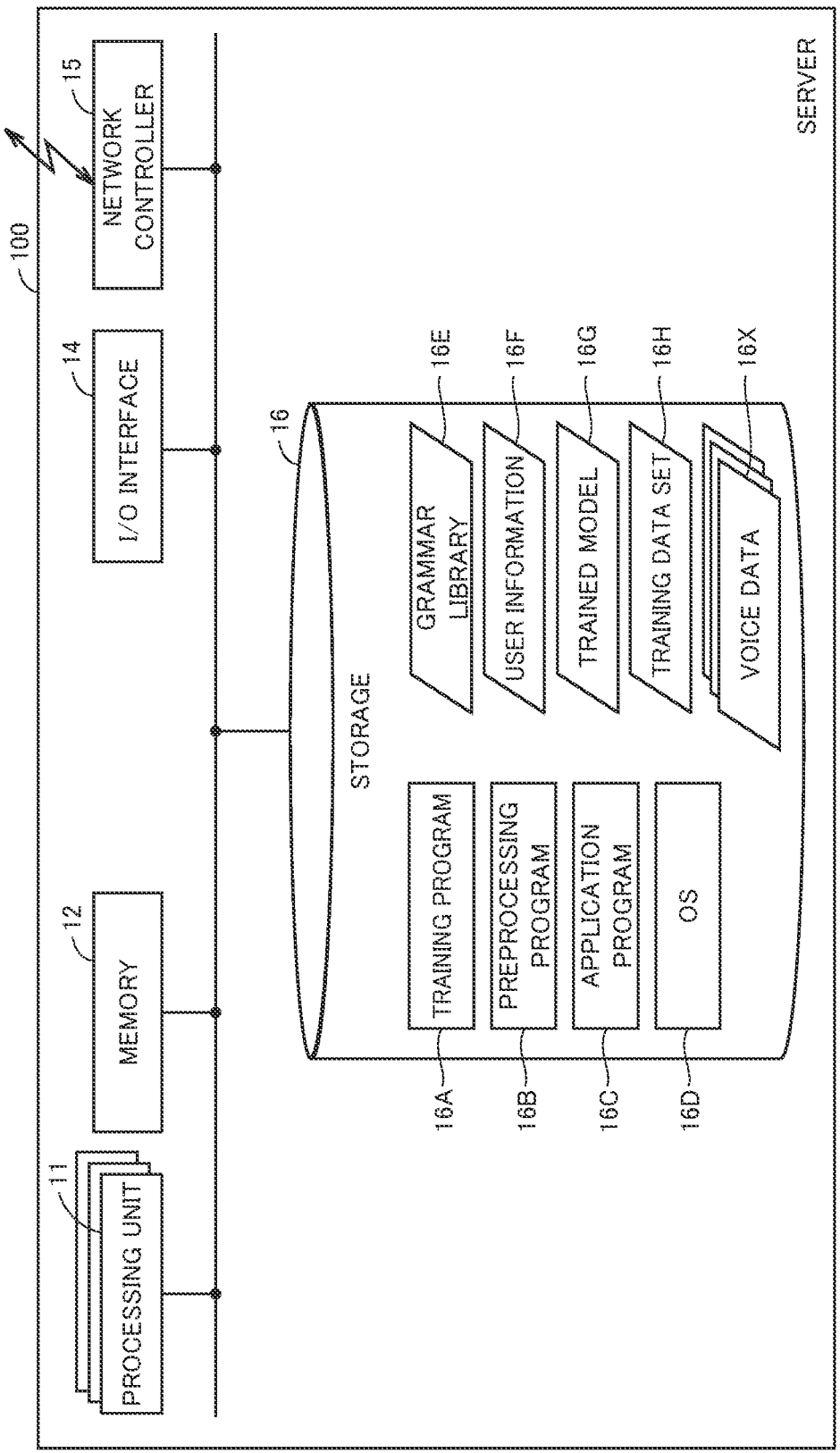
FIG. 10 is a diagram representing a hardware configuration of a server.

FIG. 10 illustrates a hardware configuration of server 100. With reference to FIG. 10, server 100 includes a processing unit 11, a memory 12, an input/output (I/O) interface 14, a network controller 15, and a storage 16 as main hardware elements.

Processing unit 11 is a computing entity that performs processing necessary for implementing server 100 by executing various types of programs as will be described hereinafter. Processing unit 11 is for example one or more central processing units (CPUs) and/or graphics processing units (GPUs). Processing unit 11 may be a CPU or GPU having a plurality of cores. Processing unit 11 may be a Neural network Processing Unit (NPU) suitable for a training process for generating a trained model, as described hereinafter.

Memory 12 provides a storage area which temporarily stores program codes, work memory, and the like for processing unit 11 to execute a program. Memory 12 may be a volatile memory device, such as DRAM (Dynamic Random Access Memory) and SRAM (Static Random Access Memory), for example.

Processing unit 11 can receive data from a device (a keyboard, a mouse, and the like) connected via I/O interface 14, and may output data to a device (a display, a speaker, and the like) via I/O interface 14.

Network controller 15 communicates data with any information processor including user terminal 200 through a public line and/or a LAN (Local Area Network). Network controller 15 may be a network interface card, for example. Server 100 may send a request to an external Web API using network controller 15 in order to obtain a response to a query. Network controller 15 may conform to any system, such as the Ethernet®, a wireless LAN, and Bluetooth®, for example.

Storage 16 may be a nonvolatile memory device, such as a hard disk drive or a SSD (Solid State Drive), for example. Storage 16 stores a training program 16A, a pre-processing program 16B, an application program 16C, and an OS (Operating System) 16D run in processing unit 11.

Processing unit 11 executes training program 16A, pre-processing program 16B, application program 16C, and OS (operating system) 16D. In embodiments, the server 100 may receive voice data from different users, and use that voice data for each user to build a trained model 16G for each user. That trained model 16G may then be downloaded to a user terminal 200 for that user to enable the user terminal 200 to perform local speech recognition of utterances from that user.

Toward that end, server 100 may include a training program 16A for training trained model 16G used for speech recognition of queries. In embodiments, the training program 16A may be some configuration of a neural network. Preprocessing program 16B is a program for generating a training data set 16H for individual users by collecting and preprocessing voice data input from the individual users for training trained model 16G. By using collected voice data input from a specific user, trained model 16G can be personally trained to the specific user. Application program 16C is a program for sending a response to a query to client terminal 200 in response to input of the query from client terminal 200. OS 16D is a basic software program for managing other processing in server 100.

Storage 16 further stores a grammar library 16E, user information 16F, trained model 16G, training data set 16H, and voice data 16X. Grammar library 16E stores information about a grammar used for interpretation of a meaning of a query. Grammar library 16E has a data configuration, which will be described hereinafter with reference to FIG. 11.

User information 16F stores information about each user registered in the query processing system. User information 16F has a data configuration, which will be described hereinafter with reference to FIG. 12.

Trained model 16G is used for speech recognition of a query, as has been discussed above. Training data set 16H is a data set used for training trained model 16G. In training data set 16H, each of voice data may be tagged to each user who uttered the corresponding voice, a phonetic transcription indicating a word or a phrase that the user intended to utter, the attribution (age, sex, occupation, etc.) of the user, and/or a situation (location, time, etc.) in which the user uttered the corresponding voice. Voice data 16X is collected for training trained model 16G, and stored in storage 16.

4. Data Configuration of Grammar Library 16E

FIG. 11 illustrates a data configuration of grammar library 16E.

Grammar library 16E stores grammars used for interpretation of meaning of queries and information related to each grammar.

The information associated with each grammar includes an item (or domain) for classifying the grammar. In FIG. 11, domains A to G are indicated. Though all the domains indicated in FIG. 11 include a plurality of grammars, some domains may include only one grammar.

Domain A includes grammars A1, A2 and A3 or the like. Grammar A1 defines a combination of words "turn on the radio." Grammar A2 defines a combination of words "close the window," and Grammar A3 defines a combination of words "open the window." Grammars belonging to domain A are mainly used for interpretation of queries input inside a vehicle to realize a function to manipulate elements of the vehicle.

Domain B includes grammar B1 or the like. Grammar B1 defines a combination of words "show me the medical record." Grammars belonging to domain B are mainly used for interpretation of queries input in an operating room to realize a function to provide users in the operating room with information.

Domain C includes grammar C1 or the like. Grammar C1 defines a combination of a slot indicating a name of a company (<name of company> in FIG. 11) and a word "check." Grammars belonging to domain C are mainly used for interpretation of queries input in an office to realize a function to provide information about stock prices.

Domain D includes grammars D1 and D2 or the like. Grammar D1 defines a combination of a slot indicating a registered name in an address book (<name> in FIG. 11) and a word "call." Grammar D2 defines a combination of a slot indicating a name of a musician (<musician> in FIG. 11), a word "by," a slot indicating a title of a song (<title> in FIG. 11), and a word "play." Grammars belonging to domain D are mainly used for interpretation of queries input in a home or office to realize a general function to provide information and a call function.

Domain E includes grammar E1 or the like. Grammar E1 defines a combination of a slot indicating a name of a dish (<dish> in FIG. 11) and words "tell me a recipe for." Grammars belonging to domain E are mainly used for interpretation of queries input in a kitchen to realize a function to provide information about cooking.

Domain F includes grammar F1 or the like. Grammar F1 defines a combination of a slot indicating a time or a date (<time> in FIG. 11) and words "what's on TV for." Grammars belonging to domain F are mainly used for interpretation of queries input in front of a TV in a home to realize a function to provide information about TV programs.

Domain G includes grammars G1 and G2 or the like. Grammar G1 defines a combination of words "what's the weather today." Grammar G2 defines a combination of a slot indicating a time or a city (<city> in FIG. 11) and words "what's the weather in . . . today." Grammars belonging to domain G are mainly used for interpretation of queries input by a user asking for a weather forecast to realize a function to provide information about weather.

An item "offline setting" in grammar library 16E defines whether the function using grammars belonging to each domain can be used while user terminal 200 is offline. The value "ON" indicates that the function can be used even while user terminal 200 is offline. The value "OFF" indicates that the function cannot be used while user terminal 200 is offline.

An item "predicted type of data" in grammar library 16E defines a type of data to predict that a user terminal will require in the future when server 100 receives a query from the user terminal.

For example, in response to input of a query "Play Yesterday by the Beatles!" server 100 interprets the meaning of the query by using grammar D2 ("play <title> by <musician>"). The value of the item "predicted type of data" for grammar D2 is "list of titles of songs by <musician>."

In the query "Play Yesterday by the Beatles!" "Yesterday" corresponds to the slot <title>, and "the Beatles" corresponds to the slot <musician>. In one implementation, in response to the above-mentioned query "Play Yesterday by the Beatles!" server 100 may further specify "list of titles of songs by the Beatles" as a "predicted type of data."

Then, server 100 may acquire data of the specified type, i.e., a list of titles of songs by the Beatles, as related data. Server 100 may send the list of titles of songs by the Beatles as related data of the query "Play Yesterday by the Beatles!" to the user terminal from which the query "Play Yesterday by the Beatles!" is sent, in addition to the response to the query "Play Yesterday by the Beatles!"

An item "time-to-live" of grammar library 16E defines a time-to-live assigned to related data. The time-to-live is mainly used in user terminal 200, and defines a time period over which data relating the query is to be maintained in memory of user terminal 200.

For example, in FIG. 11, for grammar G1's predicted type of data "weather forecast for the current place for seven days," a time-to-live of "7 days" is defined. In that case, when server 100 receives the query "what's the weather today" on October 1 from user terminal 200 located in Osaka, server 100 responds to the query by sending a weather forecast for Osaka for October 1, and in addition, sending a weather forecast for Osaka for the 7 days from October 2 to October 8 as related data. The related data is given a time-to-live of "7 days." User terminal 200 holds the related data received from server 100 for the seven days after October 1, that is, until October 8. While user terminal 200 is off-line, user terminal 200 may use the related data to output a response to a query input by the user. Once the time-to-live has passed, that is, once October 8 has passed, user terminal 200 deletes the related data from user terminal 200.

In grammar library 16E an item "count (1)" represents how many times each grammar is used to interpret a meaning of a query. An item "count (2)" represents how many times in total any grammar belonging to each domain is used to interpret a meaning of a query. For example, when grammar A1 is used for interpreting a meaning of a query, the count (1) of grammar A1 has a value incremented by 1, and further, the count (2) of domain A has a value incremented by 1.

5. Data Structure of User Information 16F

FIG. 12 illustrates a data structure of user information 16F. User information 16F associates "user ID," "terminal ID" and "sent grammars." The item "sent grammars" defines name(s) of domain(s) to which the grammars sent to each user terminal belong.

A user ID defines a value assigned to each user. A terminal ID represents a value assigned to each user terminal 200. Sent grammars represent domains to which grammars sent to each user terminal 200 belong.

In the example of FIG. 12, terminal ID "SP01" is associated with user ID "0001" and domains A and C. This means that a user assigned user ID "0001" sent one or more queries to server 100 by using a terminal assigned terminal ID "SP01," and that server 100 sent grammars belonging to domains A and C to the terminal assigned terminal ID "SP01."

In one implementation, server 100 may send only a grammar of a portion of a domain to each user terminal 200. In that case, user information 16F may specify as a value of "sent grammar" a grammar (grammar A1, etc.) sent to each user terminal 200.

6. Hardware Configuration (User Terminal 200)

Figure 13:
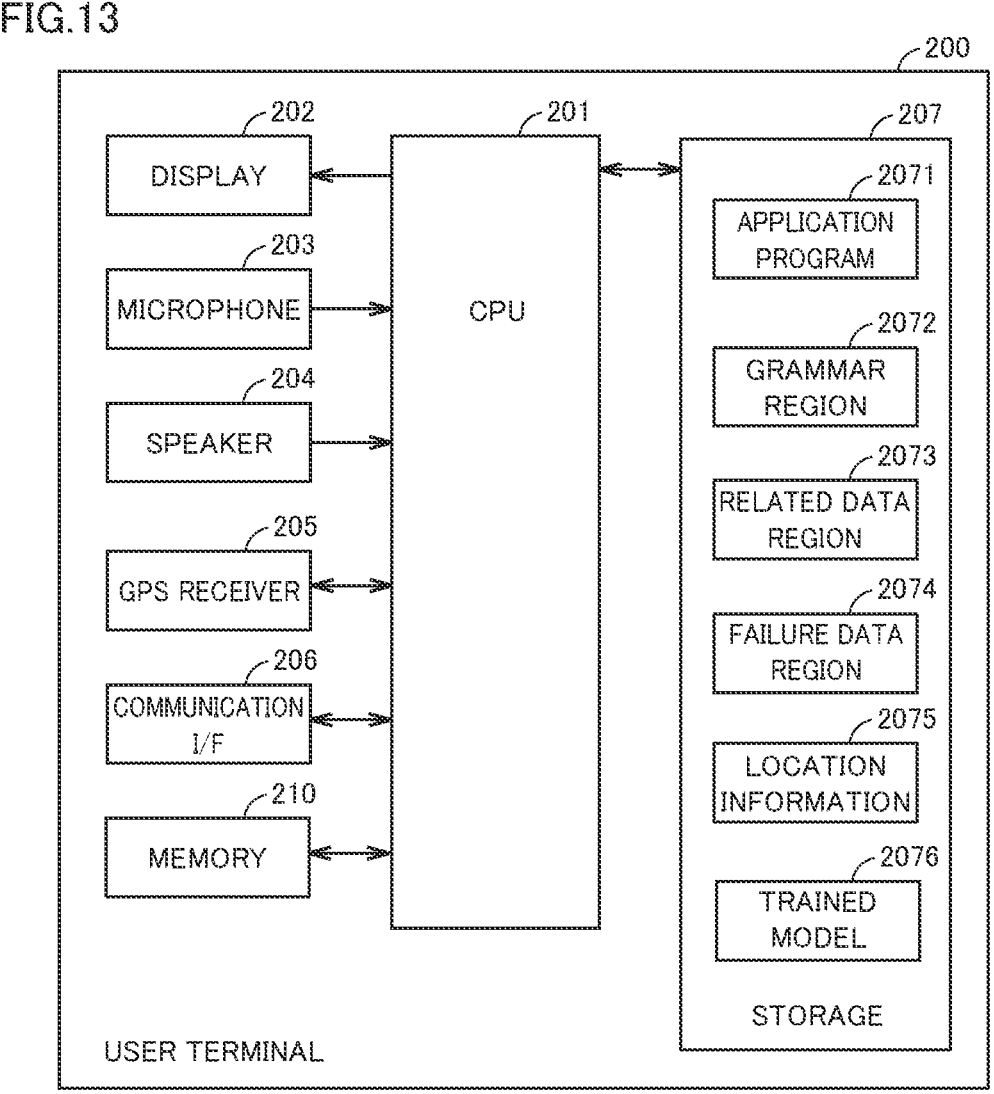
FIG. 13 is a diagram representing a hardware configuration of the user terminal.

FIG. 13 illustrates a hardware configuration of user terminal 200. With reference to FIG. 13, user terminal 200 includes as main hardware elements a CPU 201, a display 202, a microphone 203, a speaker 204, a GPS (Global Positioning System) receiver 205, a communication interface (I/F) 206, a storage 207, and a memory 210.

CPU 201 is a computing entity that performs processing necessary for implementing user terminal 200 by executing various types of programs as will be described hereinafter.

Display 202 may be a liquid crystal display device, for example. CPU 201 may cause display 202 to display a result of having performed a process.

Microphone 203 receives voice input and outputs a signal corresponding to the received voice for CPU 201 to access. Speaker 204 provides audio output. CPU 201 may output a result of having performed a process audibly through speaker 204.

GPS receiver 205 receives a signal from GPS satellites and outputs the signal for CPU 201 to access. CPU 201 may determine the current position of user terminal 200 based on the signal received from GPS receiver 205. Communication I/F 206 communicates data with any information processor including server 100 through a public line and/or a LAN. Communication I/F 206 may be a mobile network interface, for example.

Storage 207 may be a nonvolatile memory device, such as a hard disk drive or a SSD (Solid State Drive), for example. Storage 207 stores an application program 2071. In addition, storage 207 includes a grammar region 2072, a related data region 2073, a failure data region 2074, location information 2075, and a personalized trained model 2076.

Application program 2071 is a program for receiving a query input by a user and outputting a response to the query. Application program 2071 may be a car navigation program or an assistant program, for example.

Grammar region 2072 stores a grammar sent from server 100. Related data region 2073 stores related data related to the grammar and sent from server 100. Failure data region 2074 stores a target query when user terminal 200 has failed interpreting what the query means.

Location information 2075 indicates the location of user terminal 200 and information which may be used to select types of grammars used in interpreting what queries mean. Location information 2075 has a data configuration, which will be described hereinafter with reference to FIG. 14. Trained model 16G is sent from server 100 and stored in storage 207 as personalized trained model 2076.

7. Data Structure of Location Information 2075

FIG. 14 illustrates a detailed structure of location information 2075. Location information 2075 correlates location "home" and grammar "domains D, E, F, and G," and correlates location "office" and grammar "domain C."

User terminal 200 may determine one or more grammars to be used in interpretation of meaning of queries while offline based on information in FIG. 14. For example, the user terminal 200 will use different grammars depending on the location of the user terminal 200.

In response to input of a query, user terminal 200 may specify its position. In one example, the position of user terminal 200 can be specified based on a GPS signals received by GPS receiver 205. In another example, the position of user terminal 200 can be specified based on a kind of a beacon signal received by user terminal 200. In another example, the position of user terminal 200 can be specified based on network information such as an IP address or mobile base station ID.

In one implementation, if the specified position is within the location previously registered as "home," user terminal 200 may try to interpret a meaning of the query using grammars belonging to domains D, E, F, and G, and may not try to interpret a meaning of the query using grammars belonging to other domains. If the specified position is within the location previously registered as "office," user terminal 200 may try to interpret a meaning of the query using grammars belonging to domain C, and may not try to interpret of the query using grammars belonging to other domains.

8. Process in Server 100

Figure 15:
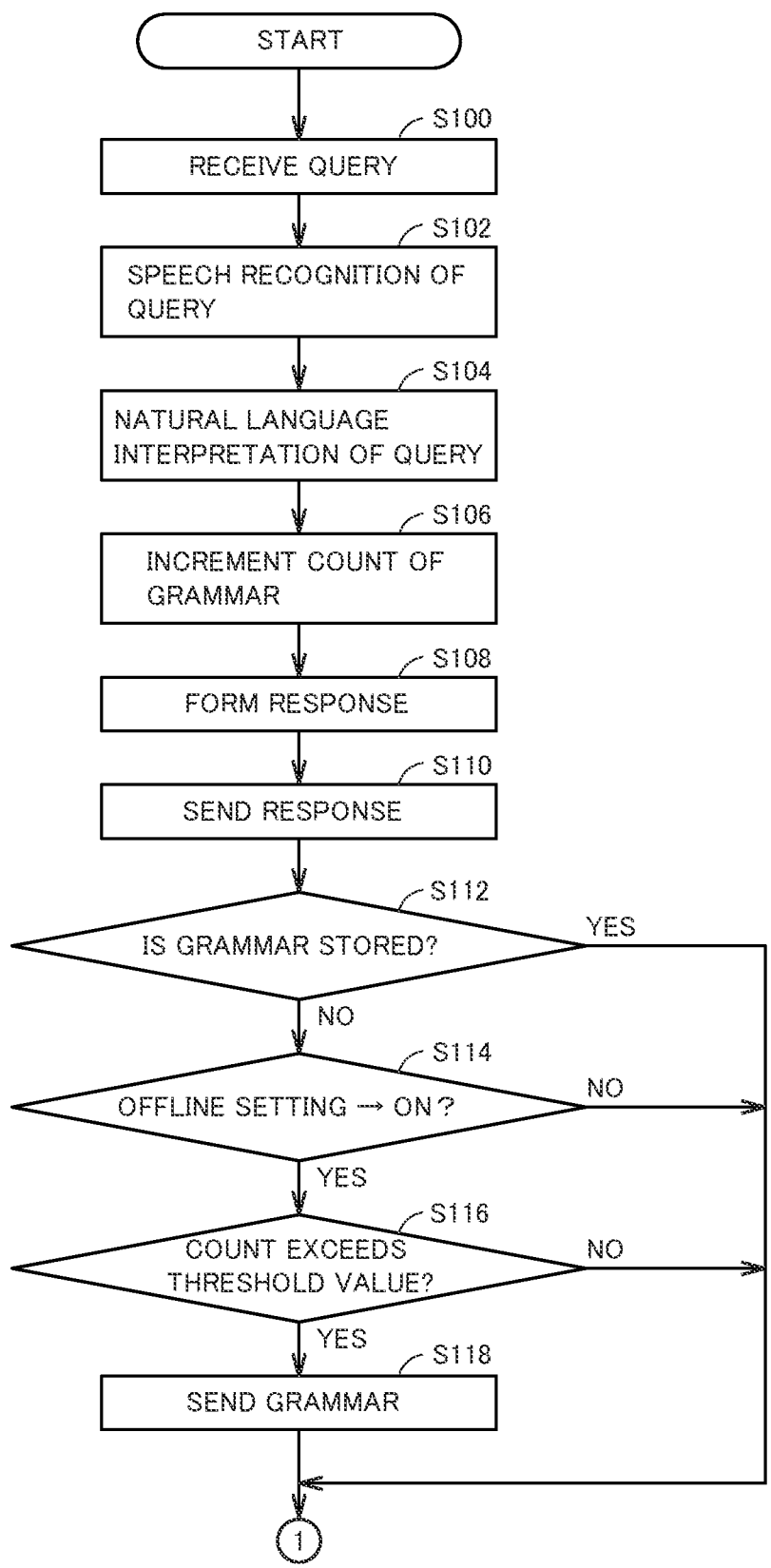
FIG. 15 is a flowchart of a process performed in the server for outputting a response to a query.
Figure 16:
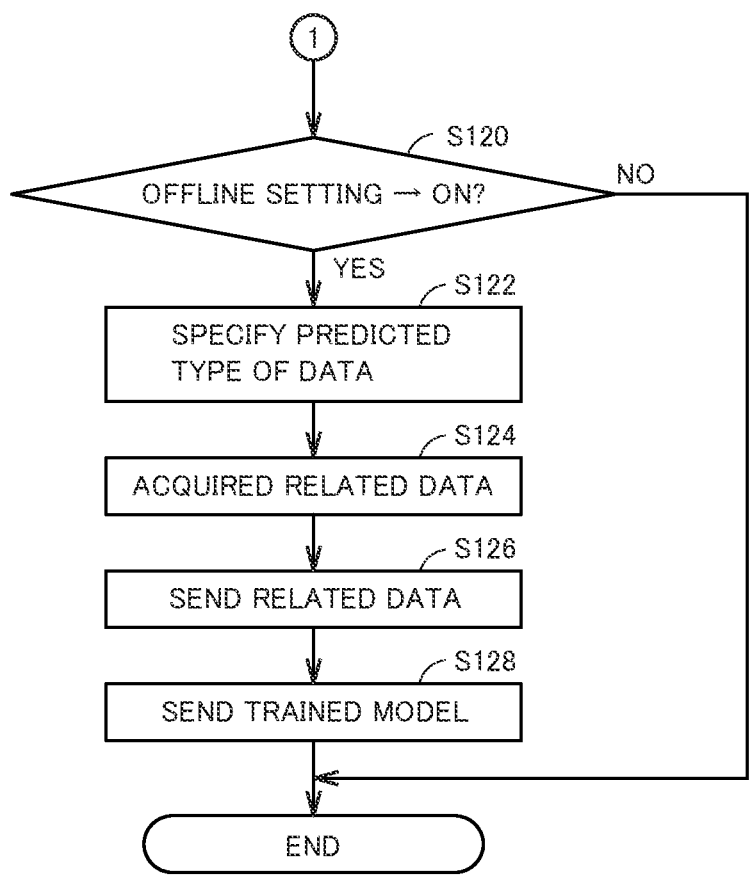
FIG. 16 is a flowchart of a process performed in the server for outputting a response to a query.

FIGS. 15 and 16 are a flowchart of a process executed in server 100 for outputting a response to a query. In one implementation, the process is implemented by processing unit 11 running application program 16C. In one implementation, server 100 starts the process in response to reception of data which declares that a query is sent.

Initially, with reference to FIG. 15, in step S100, server 100 receives a query from user terminal 200.

In step S102, server 100 subjects the query received from user terminal 200 to speech recognition to generate a transcription of the query. When the query is sent from user terminal 200 in a form other than voice, step S102 may be skipped. The user can input the query to user terminal 200 in a text format. User terminal 200 can send the query to server 100 in a text format. When server 100 receives a query in a text format, server 100 may skip step S102.

In step S104, server 100 subjects the transcription generated in step S102 (or the text data received from user terminal 200) to natural language interpretation. Thus, the query's meaning is interpreted.

Server 100 in step S104 may select one of a plurality of grammars on server 100 to interpret the meaning of the query, and interpret the meaning of the query by using the selected grammar.

In one implementation, each of step S102 and step S104 for multiple transcriptions are performed in multiple iterations such that natural language interpretation happens on the multiple transcriptions when one speech of a user includes the multiple transcriptions.

In step S106, server 100 increments a count for grammar library 16E for the grammar used to interpret the meaning of the query in step S104. More specifically, server 100 increments count (1) by one for the grammar used and increments count (2) by one the total any grammar belonging to each domain is used.

In step S108, server 100 forms a response to the query based on the interpretation done in step S104.

In one example, as a response to the query "Turn on the radio," server 100 obtains an instruction to turn on a radio mounted in a vehicle. In another example, in order to obtain a response to the query "Check Company A," server 100 may make an inquiry for Company A's stock price by sending at least a portion of the query (Company A) to an API which provides stock prices. As a reply to that inquiry, server 100 obtains, as a reply to the query "Check company A.", the stock price of company A from the API.

In yet another example, as a response to the query "Play Yesterday by the Beatles," server 100 obtains an instruction to search for and retrieve an audio file of Yesterday by the Beatles and an instruction to play that audio file.

In step S110, server 100 sends the response obtained in step S108 to user terminal 200.

In step S112, server 100 determines whether the grammar used in step S104 is stored in user terminal 200. In one implementation, server 100 refers to user information 16F (see FIG. 12) for the grammar(s) having been sent to user terminal 200 that is a sender of the query sent in step S100. More specifically, when a grammar belonging to a domain stored as a sent grammar includes a grammar used in step S104, server 100 determines that the grammar is stored in user terminal 200.

When server 100 determines that the grammar used in step S104 is stored in user terminal 200 (YES in step S112), the control proceeds to step S120 (FIG. 16), otherwise (NO in step S112), the control proceeds to step S114.

Some implementations do not include step S112 and proceed directly from step S110 to step S114. In such implementations, user terminal 200 can sometimes receive one grammar more than once and disregard (or delete) a copy. This uses more communication bandwidth by increasing network traffic but avoids the possible complexity of a server maintain accurate information of what grammars are stored in user terminals.

In step S114, server 100 determines whether the grammar used in step S104 has a value of "offline setting" set ON in grammar library 16E. When the grammar used in step S104 has a value of "offline setting" set ON (YES in step S114), the control proceeds to step S116, otherwise (NO in step S114), the control proceeds to step S120 (FIG. 16).

In embodiments, the user terminal 200 may be set up to only receive a grammar that has been used in response to a query some predetermined number of times. In this way, download of a grammar that is rarely used may be avoided. In accordance with this embodiment, in step S116, server 100 determines whether a count value related to the grammar used in step S104 exceeds a given threshold value. The "count value" in step S116 may be the value of count (1), that of count (2), or both that of count (1) and that of count (2) in grammar library 16E. When server 100 determines that the count value exceeds the given threshold value (YES in step S116), the control proceeds to step S118; otherwise (NO in step S116), the control proceeds to step S120 (FIG. 16).

In step S118, server 100 sends to user terminal 200 the grammar used in step S104. In step S118, server 100 may further send to user terminal 200 another grammar belonging to the same domain as the grammar used in step S104. Subsequently, the control proceeds to step S120 (FIG. 16).

With reference to FIG. 16, in step S120, as well as in step S114, server 100 determines whether the grammar used in step S104 has a value of "offline setting" set ON in grammar library 16E. When the grammar used in step S104 has a value of "offline setting" set ON (YES in step S120), the control proceeds to step S122, otherwise (NO in step S120), the control ends the process.

In step S122, server 100 specifies in grammar library 16E a "predicted type of data" corresponding to the grammar used in step S104.

When grammar D2 is used in step S104, server 100 specifies as a "predicted type of data" a list of titles of songs of a musician included in the query. More specifically, when the meaning of the query "Play Yesterday by the Beatles" is interpreted using grammar D2, server 100 specifies "a list of titles of songs by the Beatles" as the "predicted type of data."

When grammar G2 is used in step S104, server 100 specifies a 7-day weather forecast for a city included in the query as a "predicted type of data." More specifically, when the meaning of the query "Tell me the weather in Osaka" is interpreted using grammar G2, server 100 specifies as the "predicted type of data" "a weather forecast in Osaka for seven days from the next day as counted from the day on which the query is input."

In step S124, server 100 obtains, as related data, data of the type specified in step S122. For example, when server 100 specifies "a list of titles of songs by the Beatles" as a "predicted type of data," server 100 obtains data of the list. When server 100 specifies as a "predicted type of data" "a weather forecast for Osaka for seven days from the next day as counted from the day on which the query is input," server 100 requests a weather forecast in Osaka for the seven days from a weather forecast API and obtains data of the weather forecast obtained in response to that request. In step S126, server 100 sends to user terminal 200 the related data obtained in step S124.

In step S128, server 100 sends personalized trained model 16G corresponding to the user of user terminal 200 to user terminal 200. In one implementation, server 100 refers to user information 16F (see FIG. 12) to specify a user ID associated with user terminal 200 with which server 100 communicates, and server 100 sends to user terminal 200 personalized trained model 16G stored in storage 16 in association with the identified user. Subsequently, server 100 ends the process.

Thus, in the process described with reference to FIGS. 15 and 16, server 100 sends to user terminal 200 a grammar used for natural language interpretation of a query received from user terminal 200.

As has been described for step S112, server 100 may send the grammar to user terminal 200 when the grammar is not stored in user terminal 200. As has been described for step S114, server 100 may send the grammar to user terminal 200 when user terminal 200 is configured to function using the grammar in the offline state (or has a value of offline setting set ON). As has been described for step S116, server 100 may send the grammar to user terminal 200 when how many times the grammar used in step S104 (or count (1)) or how many times any grammar belonging to the same domain as that grammar (or count (2)) exceeds a given threshold.

As has been described for steps S122-S126, server 100 may predict, based on the input query, a type of data required for responding to a query received in the future (or a predicted type of data), and send the predicted type of data (or related data) to user terminal 200.

Server 100 may further send a time-to-live of the related data in step S126. The time-to-live may be specified for each "predicted type of data," as shown in FIG. 11. The time-to-live may be sent as metadata of the related data.

Server 100 may perform a process for training trained model 16G. The training may be done for each user. As has been described for step S128, server 100 may send trained model 16G for the user of user terminal 200 to user terminal 200.

In one embodiment, in training of trained model 16G at server 100, one or more utterances of one or more users and text data for each of the one or more utterances can be used as training data set 16H. The training data may further include information related to each of the one or more users (names in the "contact list" file stored in the user terminal of each user, for example). Techniques described in Reference 1 ("Robust i-vector based Adaptation of DNN Acoustic Model for Speech Recognition", <URL: http://wwwl.icsi.berkeley.edu/~rsparta/2015_ivector_paper.pdf>), Reference 2 ("PERSONALIZED SPEECH RECOGNITION ON MOBILE DEVICES", <URL: https://arxiv.org/pdf/1603.03185.pdf>), Reference 3 ("Speech Recognition Based on Unified Model of Acoustic and Language Aspects of Speech", <URL: https://www.ntt-review.jp/archive/ntttechnical.php?contents=ntr201312fa4.pdamode=show_pdf>), and Reference 4 ("Speech Recognition Based on Unified Model of Acoustic and Language Aspects of Speech", <URL: https://www.ntt.co.jp/journal/1309/files/jn201309022.pdf>) can be used for the training of trained model 16G.

9. Process in User Terminal 200

Figure 17:
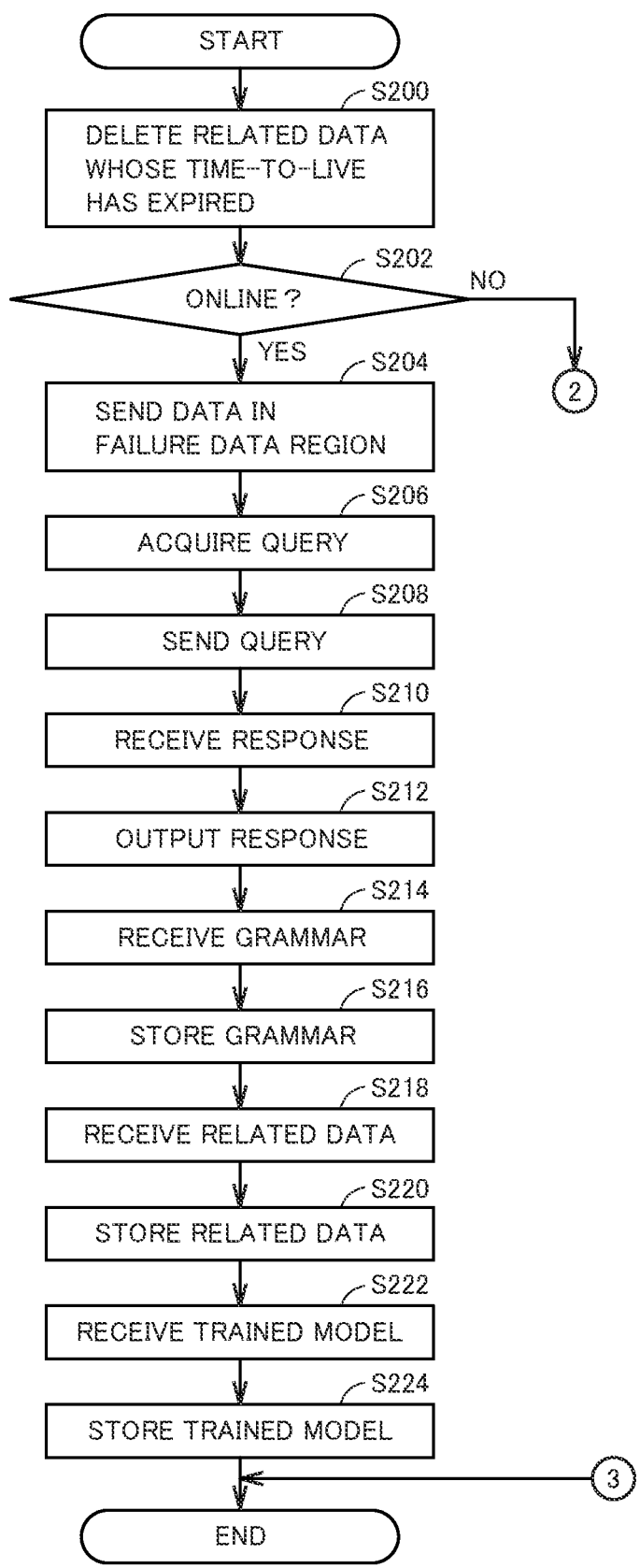
FIG. 17 is a flowchart of a process performed in the user terminal.
Figure 18:
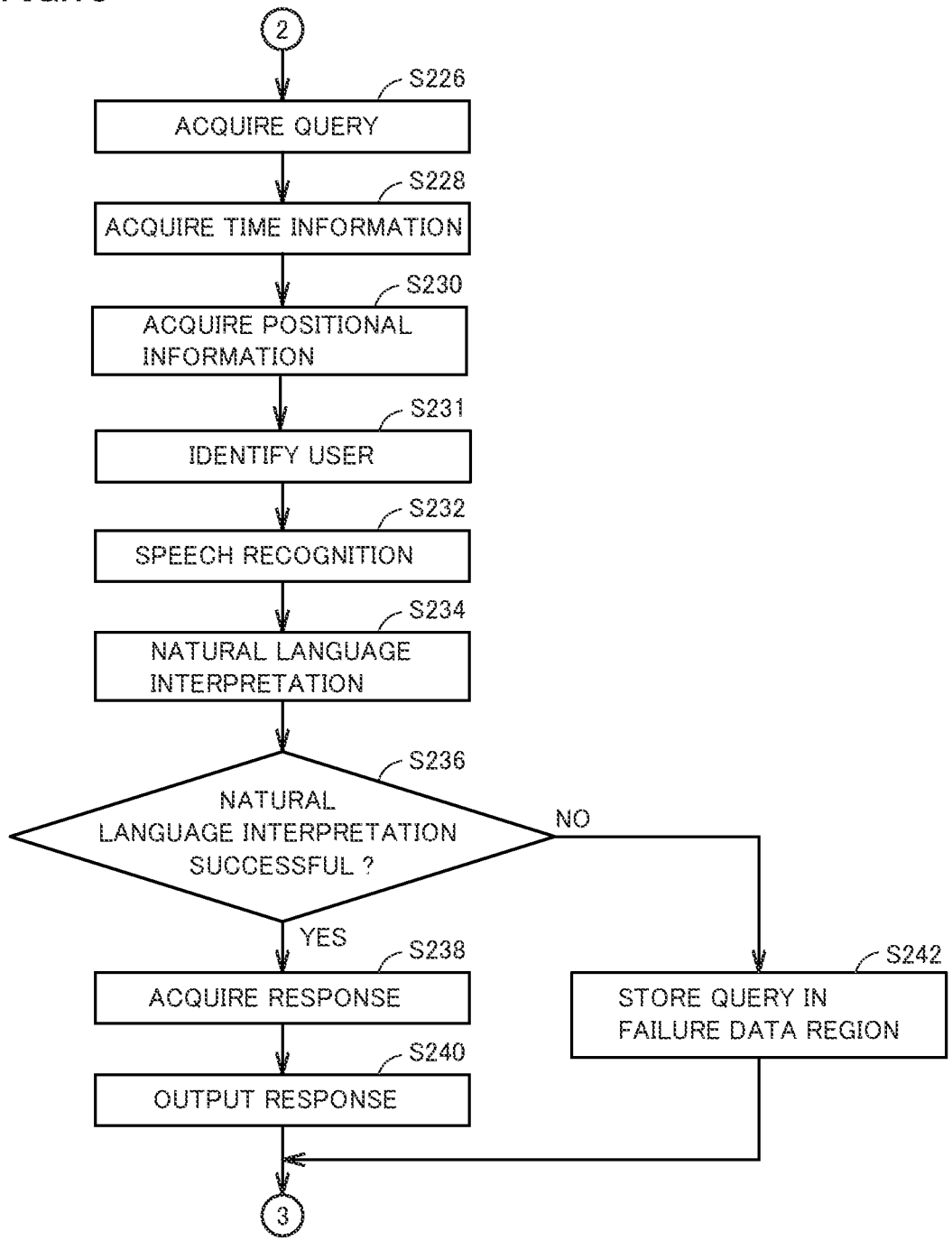
FIG. 18 is a flowchart of a process performed in the user terminal.

FIGS. 17 and 18 are a flowchart of a process executed by user terminal 200. In one implementation, CPU 201 of user terminal 200 implements the process by executing a given program. The process is started for example whenever a predetermined period of time elapses.

Referring to FIG. 17, in step S200, user terminal 200 deletes related data stored in related data regions 2073 that has passed a time-to-live.

In step S202, user terminal 200 determines whether user terminal 200 is online (or communicable with server 100). When user terminal 200 determines that user terminal 200 is online (YES in step S202), the control proceeds to step S204; otherwise (NO in step S202), the control proceeds to step S226 (see FIG. 18).

In step S204, user terminal 200 sends to server 100 any query stored in failure data region 2074 (see step S242 below). When the query is associated with time information and/or location information, the time information and/or location information may also be sent to server 100 in step S204. After the query is sent, user terminal 200 may delete the sent query from failure data regions 2074.

In step S206, user terminal 200 obtains a query. In an example, the query is input via voice through microphone 203. In another example, the query is input in the form of text data by operating a touch sensor (not shown) of user terminal 200.

In step S208, user terminal 200 sends to server 100 the query obtained in step S206. The sent query may be received by server 100 in step S100 (see FIG. 15).

In step S210, user terminal 200 receives a response to the query from server 100. The response may be sent from server 100 in step S110 (see FIG. 15).

In step S212, user terminal 200 outputs the response received from server 100. An example of the response output is an action following an instruction included in the response. For example, when the response includes an "instruction to turn on the radio", user terminal 200 turns on a radio mounted in a vehicle in which user terminal 200 is mounted.

In step S214, user terminal 200 receives a grammar sent from server 100. The grammar may be sent from server 100 in step S118 (see FIG. 15).

In step S216, user terminal 200 stores in grammar region 2072 the grammar received in step S214.

In step S218, user terminal 200 receives related data. The related data may be sent from server 100 in step S126 (see FIG. 16).

In step S220, user terminal 200 stores in related data region 2073 the related data received in step S218.

In step S222, user terminal 200 receives trained model 16G. Trained model 16G may be sent from server 100 in step S128 (see FIG. 16).

In step S224, user terminal 200 stores trained model 16G that is received in step S222 in storage 207 as personalized trained model 2076. Subsequently, user terminal 200 ends the process.

Queries sent to server 100 in step S208 may result in all, none, or any combination of grammars as in step S214, related data as in step S218, and a personalized trained speech recognition model as in step S222.

In accordance with aspects of the present technology, when it is determined in step S202 that the user terminal 200 is offline (with no connection to server 100), the user terminal 200 uses speech recognition to parse the utterance into a query. The personalized trained model 2076 (generated at server 100 and downloaded to user terminal 200) may be used for this purpose. Once a query is recognized, the present technology may then use one or more of the downloaded and locally stored grammars to interpret a natural language meaning of the query. The present technology may apply a variety of predefined criteria, explained below, in selecting which locally stored grammar or grammars stored at server 100 to use. FIG. 18 explains these steps in greater detail.

In step S226, user terminal 200 obtains a query similarly as done in step S206. In step S228, user terminal 200 obtains time information representing when the query is obtained by user terminal 200. The obtained time information may be associated with the query obtained in step S226, and thus stored in storage 207.

In step S230, user terminal 200 obtains location information representing where user terminal 200 is located when the query is obtained by user terminal 200. The obtained location information may be associated with the query obtained in step S226, and thus stored in storage 207.

In step S231, user terminal 200 identifies which one of multiple possible users is using user terminal 200. In some embodiments, the identification of one user may be performed by reading out the profile of a logged-in account. In some embodiments, the identification of one user may also be performed by using a voice fingerprinting algorithm on the audio of the voice query. Based on the identification of the user, user terminal 200 chooses one trained model of one or more models as personalized trained model 2076.

In step S232, user terminal 200 subjects the query obtained in step S226 to speech recognition. In the speech recognition, user terminal 200 may use personalized trained model 2076. Step S232 may be performed when the query is input via voice. Step S232 may be skipped when the query is input as text data.

In step S234, user terminal 200 subjects the query obtained in step S226 to natural language interpretation. Thus, the query's meaning is interpreted. In the natural language interpretation, user terminal 200 may use a grammar stored in grammar region 2072. The grammar stored in grammar region 2072 includes the grammar used to interpret the meaning of the query obtained in step S206. That is, user terminal 200 can use a grammar used in interpreting the meaning of the query obtained in step S206 (a first query) to interpret the meaning of the query obtained in step S226 (a second query).

A grammar used for natural language interpretation may be selected depending on the situation where user terminal 200 obtains the query. Examples of how different situations affect which grammar is used are explained below. Limiting a grammar which can be used depending on the situation can prevent more reliably an improper grammar from being used in subjecting a query to natural language interpretation. That is, the meaning of the query can be interpreted with increased precision.

In one example, user terminal 200 may refer to location information 2075 (see FIG. 14) to follow location information that is obtained when a query is obtained to select a range of grammars that can be used in the natural language interpretation. In the example of FIG. 14, when the location information obtained when a query is obtained is included in a location registered as "home," a grammar used for natural language interpretation is selected from domains D, E, F, and G. When the location information obtained when a query is obtained is included in a location registered as "office", a grammar used for the natural language interpretation is selected from domain C.

In another example, user terminal 200 may follow time information that is obtained when a query is obtained to select a range of grammars that can be used in the natural language interpretation. More specifically, when the time information is included in a time zone registered as the user's working hours, a grammar used for the natural language interpretation is selected from domain C. When the time information is not included in the time zone registered as the user's working hours, a grammar used for the natural language interpretation is selected from domains D, E, F and G.

In yet another example, user terminal 200 may follow a combination of location information and time information that are obtained when a query is obtained to select a range of grammars that can be used for the natural language interpretation. More specifically, when the location information obtained when the query is obtained is included in a location registered as "home", and the time information obtained when the query is obtained is included in a time zone registered as the user's cooking time, a grammar used for the natural language interpretation is selected from domain E, whereas when the location information obtained when the query is obtained is included in the location registered as "home", and the time information obtained when the query is obtained is not included in the time zone registered as the user's cooking time, a grammar used for the natural language interpretation is selected from domains D, F and G.

In some implementations, the location information and/or the time information constraint are not strict conditions but instead provide a weight to one or more hypothesized correct grammars for interpreting each given text or utterance transcription. In one example, application program 16C outputs possibility of each grammar to be applied for the given text or utterance transcription. Application program 16C selects the grammar having the largest sum of the output possibility and the weight, as a grammar to be used in interpretation of the given text or utterance transcription.

In step S236, user terminal 200 determines whether the natural language interpretation in step S234 has successfully been performed. User terminal 200 determines that the natural language interpretation is successful if the query is interpreted by any of one or more grammars stored in grammar region 2072. In contrast, user terminal 200 determines that the natural language interpretation has failed if the query is not interpreted by any of one or more grammars stored in grammar regions 2072.

When it is determined that the natural language interpretation in step S234 is successful (YES in step S236), user terminal 200 proceeds to step S238. When it is determined that the natural language interpretation in step S234 has failed (NO in step S236), user terminal 200 proceeds to step S242.

In step S238, user terminal 200 obtains a response to the query obtained in step S226, based on the interpretation done in step S234. User terminal 200 may obtain the response to the query from the related data in related data region 2073.

In one example, when a query "Play Yesterday by the Beatles" is obtained in step S206, user terminal 200 stores a list of titles of songs by the Beatles as related data in related data regions 2073 in step S220. Subsequently, in step S226, when a query "Tell me a list of songs by the Beatles" is obtained, user terminal 200 obtains as a response to that query a list of songs of the Beatles stored in related data regions 2073.

In step S240, user terminal 200 outputs the response obtained in step S238. Subsequently, user terminal 200 ends the process.

In step S242, user terminal 200 stores in failure data regions 2074 the query obtained in step S226. The query stored in failure data regions 2074 is sent to server 100 in step S204. Subsequently, user terminal 200 ends the process.

In the process described with reference to FIGS. 17 and 18, a query for which the natural language interpretation has failed when user terminal 200 is offline is sent to server 100. A query for which the natural language interpretation is successfully performed when user terminal 200 is offline may also be sent to server 100. Thus, server 100 can obtain a query input to user terminal 200 when it is offline. Server 100 may specify a grammar used to interpret what these queries mean. Server 100 may increment and thus update count (1) and count (2) for a specified grammar. Thus, information about a query input to user terminal 200 when it is offline may also be reflected in a value of count (1) and that of count (2).

The disclosed features can be summarized as a computer-implemented method, a system, a computer software (program) and/or a non-transitory computer-readable data storage medium which stores therein instructions to perform the method. For example, according to one aspect of the present disclosure, a non-transitory computer-readable data storage medium stores instructions for implementing a method including receiving input of a query from a client terminal; performing natural language interpretation of the query using a grammar; outputting a response to the query after performing the natural language interpretation; and sending the grammar to the client terminal.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims. In addition, the embodiments and modifications described are intended to be implemented singly or in combination as far as possible.

REFERENCE SIGNS LIST

100: server; 200, 200A to 200G: user terminal; 1500: estimation model.

What is claimed is:

1. A computer-implemented method, comprising:
receiving input of a query from a client terminal;
performing natural language interpretation of the query using a grammar;
outputting a response to the query after performing the natural language interpretation;
sending the grammar to the client terminal;
determining, before sending the grammar to the client terminal, that the client terminal is configured to perform a function using the grammar in an offline state in which the client terminal is not connected to the computer; and counting a number of times that the grammar is used in natural language interpretation of queries from the client terminal;

wherein sending the grammar to the client terminal is conditioned upon the client terminal being configured to perform the function using the grammar in the offline state;

and wherein sending the grammar to the client terminal is conditioned upon the counted number exceeding a threshold.

2. The method of claim 1, further comprising:
determining, before sending the grammar to the client terminal, that the client does not store the grammar,
wherein sending the grammar to the client terminal is conditioned upon the client terminal not storing the grammar.

3. The method of claim 1, wherein sending the grammar to the client terminal includes sending other grammars belonging to a domain to which the grammar belongs.

4. The method of claim 1, wherein the counting includes all times that grammars belonging to a domain to which the grammar belongs are used in natural language interpretation of the query.

5. The method of claim 1, further comprising:
predicting, based on the input query, a type of data needed to respond to a future query; and
sending data of that type to the client terminal.

6. The method of claim 5, wherein the sending the data of that type includes sending a time-to-live of the data of that type.

7. The method of claim 1, wherein the query input from the client terminal includes speech audio, the method further comprising:
training a speech recognition model personalized to a user of the client terminal by using utterances of the user; and
sending the trained speech recognition model to the client terminal.

8. A server apparatus, comprising:
one or more processors; and
a storage device storing a program, when executed by the one or more processors, causing the server apparatus to perform a method of:
receiving input of queries from a client terminal;
performing natural language interpretation of the queries using one or more grammars;
counting a number of times that a grammar of the one or more grammars is used in natural language interpretation of queries from the client terminal;
outputting a response to the query after performing the natural language interpretation; and
sending the grammar to the client terminal;
wherein sending the grammar to the client terminal is conditioned upon the counted number exceeding a threshold.

9. An information system, comprising:
a client terminal; and
a server apparatus sending a response to a query input from the client terminal,
wherein the server apparatus includes one or more processors to perform natural language interpretation of the input query using a grammar,
determining whether the client terminal is configured to perform a function using the grammar in an offline state in which the client terminal is not connected to the computer;

wherein the one or more processors sends the grammar to the client terminal if it is determined that the client terminal is configured to perform the function using the grammar in the offline state;

wherein the client terminal comprises a computer readable medium storing instructions for:
sending a first query to a server apparatus;
receiving a grammar, from the server apparatus, used for natural language interpretation of the first query;
storing the received grammar in a memory;
receiving input of a second query;
performing, when the client terminal is not connected to the server apparatus, natural language interpretation of the second query using the grammar;
receiving input of a third query;
performing, when the client terminal is not connected to the server apparatus, natural language interpretation of the third query;
determining that natural language interpretation of the third query fails;
storing the third query in the memory; and
sending, in response to the failure, when the client terminal is connected to the server apparatus, the third query to the server apparatus.

10. The information system of claim 9, the method performed by the computer readable medium of the client terminal further comprising:
receiving data related to the first query;
storing the data related to the first query in the memory; and
acquiring a response to the second query using the data related to the first query.

11. The information system of claim 10,
wherein the data related to the first query includes metadata indicating a time-to-live, and
wherein the method further comprises deleting the data related to the first query from the memory after time-to-live is expired.

12. The information system of claim 9, the method performed by the computer readable medium of the client terminal further comprising:
acquiring positional information of the client terminal,
wherein the performing natural language interpretation of the second query includes selecting a grammar to be used from one or more grammars in the memory based on the positional information.

13. The information system of claim 9, the method performed by the computer readable medium of the client terminal further comprising:
acquiring a time information indicating a time when the second query is input;
wherein performing natural language interpretation of the second query includes selecting a grammar from one or more grammars in the memory based on the time information.

14. The information system of claim 9,
wherein the receiving the second query includes receiving input of speech,
the method performed by the computer readable medium of the client terminal further comprising:
receiving, from the server apparatus, a speech recognition model trained to be personalized to a user of the client terminal; and
performing, when the client terminal is not connected to the server apparatus, speech recognition of the input speech using the speech recognition model.

15. A client terminal, comprising:
one or more processors; and
a memory storing a program, when executed by the one or more processors, causing the client terminal to perform a method of:
   sending a first query to a server apparatus;
   receiving a grammar, from the server apparatus, used for natural language interpretation of the first query;
   storing the received grammar in a memory;
   receiving input of a second query from a user of the client terminal;
   performing, when the client terminal is not connected to the server apparatus, natural language interpretation of the second query using the grammar;
   determining that natural language interpretation of the second query fails;
   storing the second query in the memory; and
sending, in response to the failure, when the client terminal is connected to the server apparatus, the second query to the server apparatus.

* * * * *